United States Patent [19]

Sasaki et al.

[11] Patent Number: 5,396,301
[45] Date of Patent: Mar. 7, 1995

[54] VIDEO PROJECTOR WITH MONITOR SCREEN

[75] Inventors: Hidemi Sasaki; Shinji Suzuki; Takao Ina, all of Tokyo, Japan

[73] Assignee: Fuji Photo Film Co., Ltd., Kanagawa, Japan

[21] Appl. No.: 8,621

[22] Filed: Jan. 25, 1993

[30] Foreign Application Priority Data

Jan. 27, 1992 [JP] Japan .................. 4-012307

[51] Int. Cl.⁶ .......................... H04N 5/74; H04N 5/64
[52] U.S. Cl. ........................................ 348/794; 348/836
[58] Field of Search ............... 358/60, 61, 62, 63, 358/231, 232, 233, 236, 229, 254; H04N 9/31, 5/74; 353/15, 20, 34, 47, 72, 79, 119; 359/41; 348/744, 759, 760, 761, 766, 781, 782, 785, 787, 788, 789

[56] References Cited

U.S. PATENT DOCUMENTS

| | | | |
|---|---|---|---|
| 4,358,184 | 11/1982 | Schmidt | 353/119 |
| 4,556,913 | 12/1985 | VanBreemen et al. | 358/60 |
| 4,572,632 | 2/1986 | Bodier et al. | 353/71 |
| 4,918,535 | 4/1990 | Grabis et al. | 358/60 |

FOREIGN PATENT DOCUMENTS

| | | | |
|---|---|---|---|
| 0182979 | 7/1988 | Japan | H04N 5/74 |
| 0196192 | 8/1988 | Japan | H04N 9/31 |
| 0220681 | 9/1988 | Japan | H04N 5/74 |
| 2304591 | 12/1990 | Japan | H04N 5/74 |
| 0094590 | 4/1991 | Japan | H04N 5/74 |
| 0201787 | 9/1991 | Japan | H04N 9/31 |

Primary Examiner—James J. Groody
Assistant Examiner—Michael H. Lee
Attorney, Agent, or Firm—Sughrue, Mion, Zinn, Macpeak & Seas

[57] ABSTRACT

A video projector with a monitor screen that can be used both as an ordinary video projector and as a monitor allowing images to be viewed even in bright surroundings. The apparatus has a case on which a monitor screen is disposed, elements disposed in the interior of the case that is, a projection lens, a liquid-crystal panel for displaying an image on the basis of a video signal and a lamp, a lens cover disposed movable relative to the case so as to open and close a surface in front of the projection lens, and an optical system including a reflecting mirror capable of, in an interlocked relationship with the movement of the lens cover, advancing into and retracting from the optical axis of the projection lens, at least the reflecting mirror guiding image light to the back surface of the monitor screen. The monitor screen is disposed on a side surface of the case, and the optical system comprises two stationary reflecting mirrors as well as the one movable reflecting mirror, which mirrors serve to guide image light to the back surface of the monitor screen provided on that side surface.

20 Claims, 14 Drawing Sheets

VIDEO PROJECTOR WITH MONITOR SCREEN

BACKGROUND OF THE INVENTION

1. Field of the Invention

The present invention relates to a video projector and, more particularly, to a video projector with a monitor screen that is capable of causing an image displayed on a transmission-type display means, such as a transmission-type liquid-crystal panel, to be projected on an enlarged scale to a position ahead of a projection lens, and also capable of causing such an image to be projected on a monitor screen provided on the casing of the apparatus.

2. Description of the Related Art

In recent years, the use of camera-integrated video tape recorders (VTRs) has rapidly spread as their size and price have been reduced. It is desirable to have, for use with such VTRs, a monitor capable of inputting a video signal at any time and any place so as to obtain an image. Examples of such monitors are a small liquid-crystal monitor and a small liquid-crystal projector.

A small liquid-crystal monitor (liquid-crystal TV) in which light is projected by a fluorescent lamp or the like from behind a liquid crystal panel is constructed to enable the viewing of an image even in a relatively bright place. However, since a liquid crystal panel of three to four inches is used, the monitor is expensive. Another disadvantage is that the screen is too small to enable viewing by a large number of people.

In a small liquid-crystal projector, a light source illuminates an image displayed on a small liquid-crystal panel, and image light transmitted through the panel is projected on an enlarged scale through a projection lens. With such a projector, it is possible to view a relatively large image. However, the projector can be used only in relatively dark places.

In view of this disadvantage, Japanese Patent Laid-Open No. 2-304591 proposes a small liquid-crystal projector including a screen box which can be freely mounted on and dismounted from the casing of the projector, so that it is possible to view an image even in relatively bright places.

However, it is troublesome to mount or dismount the screen box on or from the casing of the small liquid-crystal projector. Further, in order that the screen box in its mounted position show images projected at relatively great enlargement magnifications, it is necessary to increase the distance from the projection lens to the screen, and hence, the size of the screen box.

SUMMARY OF THE INVENTION

The present invention has been made in view of the above-described circumstances. An object of the present invention is to provide a video projector with a monitor screen that is capable of being used both as an ordinary video projector and as a monitor in which images projected on a monitor screen disposed on the casing of the apparatus can be viewed even in bright surroundings, the apparatus enabling simple switching between these two modes, and the overall construction of the apparatus being compact.

In order to achieve the above object, according to the present invention, there is provided a video projector with a monitor screen, comprising: a casing on which a monitor screen is disposed; a projection lens, transmission-type display means for displaying an image on the basis of a video signal, and a projector light source, all of which are disposed in the interior of the casing; a lens cover disposed movable relative to the casing so as to open and close a surface in front of the projection lens; and an optical system including a reflecting mirror capable of, in an interlocked relationship with the movement of the lens cover, advancing into and retracting from the optical axis of the projection lens, at least the reflecting mirror guiding image light to the monitor screen.

In a preferred form of the present invention, the monitor screen is disposed on a side surface of the casing, and the optical system comprises one movable reflecting mirror, and two stationary reflecting mirrors, which mirrors serve to guide image light to the back surface of the monitor screen provided on that side surface.

With the above arrangement of the present invention, the projector mode in which an image is projected on an external screen and the monitor mode in which an image is projected on a monitor screen provided on a casing are switched from one to the other in a manner interlocked with the movement of the lens cover for the projection lens. That is, a reflecting mirror is advanced into or retracted from the optical axis of the projection lens in an interlocked relationship with the movement of the lens cover, the insertion of the reflecting mirror resulting in switching to the monitor mode so that image light emitted from the projection lens is guided to the back surface of the monitor screen.

With an arrangement in which the monitor screen is disposed on a side surface of the casing, and the optical system comprises two stationary reflecting mirrors disposed at fixed positions as well as one movable reflecting mirror capable of advancing into and retracting from the optical axis of the projection lens, image light emitted from the projection lens can be guided through the three reflecting mirrors to the back surface of the monitor screen. That is, the optical path of image light emitted from the projection lens can be bent by the three reflecting mirrors for guiding the image light to the monitor screen provided on the side surface of the casing. This arrangement makes it possible to ensure the optical path required to project an image at a desired enlargement magnification.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

Detailed description will hereunder be given of the preferred embodiments of a video projector with a monitor screen according to the present invention with reference to the accompanying drawings.

First Embodiment

Figure 1:
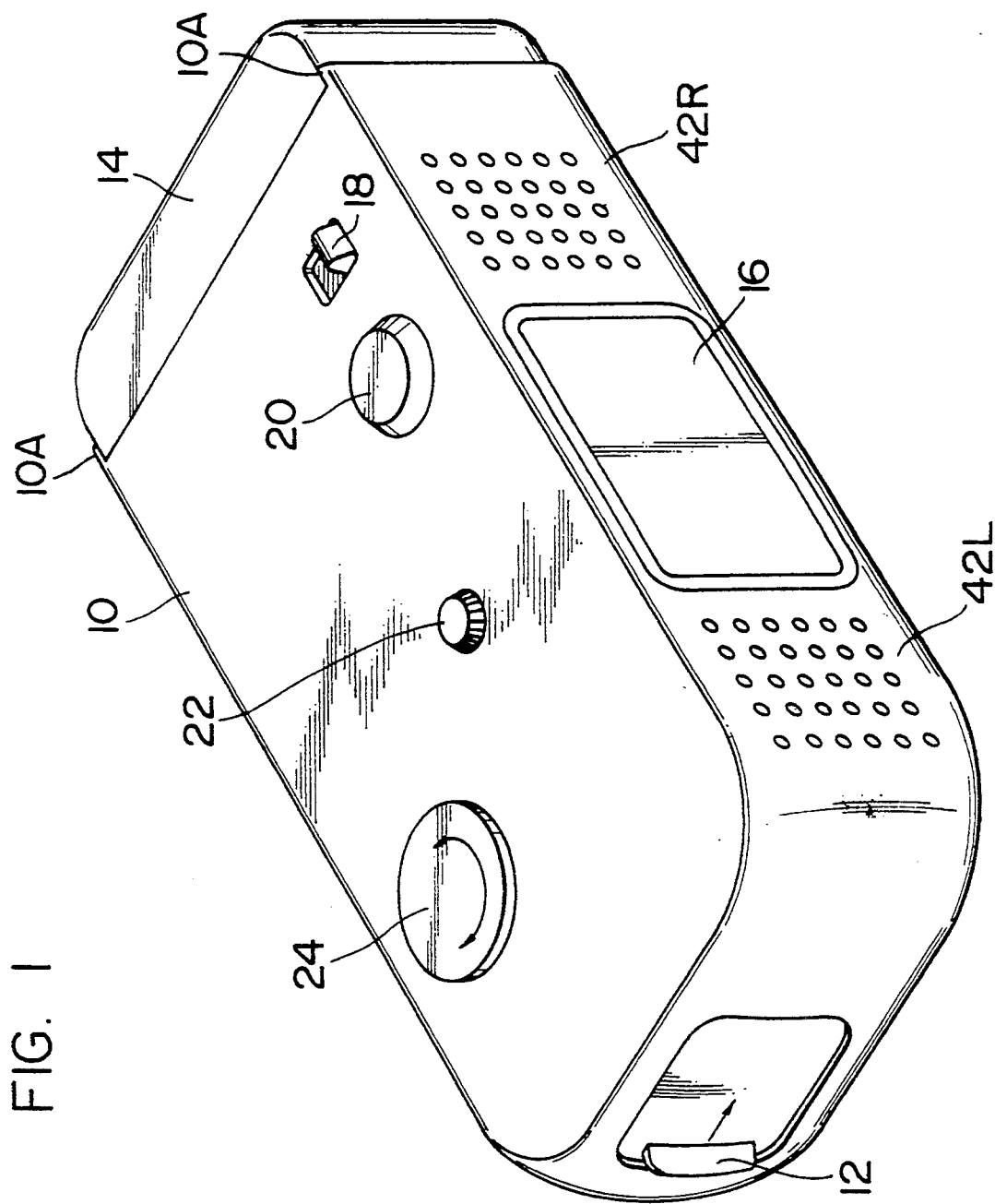
FIG. 1 is an external perspective view of a first embodiment of a video projector with a monitor screen according to the present invention.

FIG. 1 shows the external appearance of a first embodiment of a video projector with a monitor screen according to the present invention. Referring to FIG. 1, the video projector with a monitor screen has a case 10 substantially configured into a rectangular parallelepiped. The case 10 includes a front surface on which a lens cover 12 capable of opening and closing by moving to and fro is disposed (FIG. 1 shows the closed position of the lens cover 12 from which it is movable in the direction indicated by the associated arrow), a battery mounting portion 10A formed on a rear surface of the case 10 in order to mount a battery 14 for driving the projector, and a first side surface on which a monitor screen 16 is disposed. The case 10 also includes an upper surface on which a power switch control 18, a volume control 20, a panel horizontal-adjustment control 22, and a focus control 24 are provided. Details of these controls will be described later.

Figure 2:
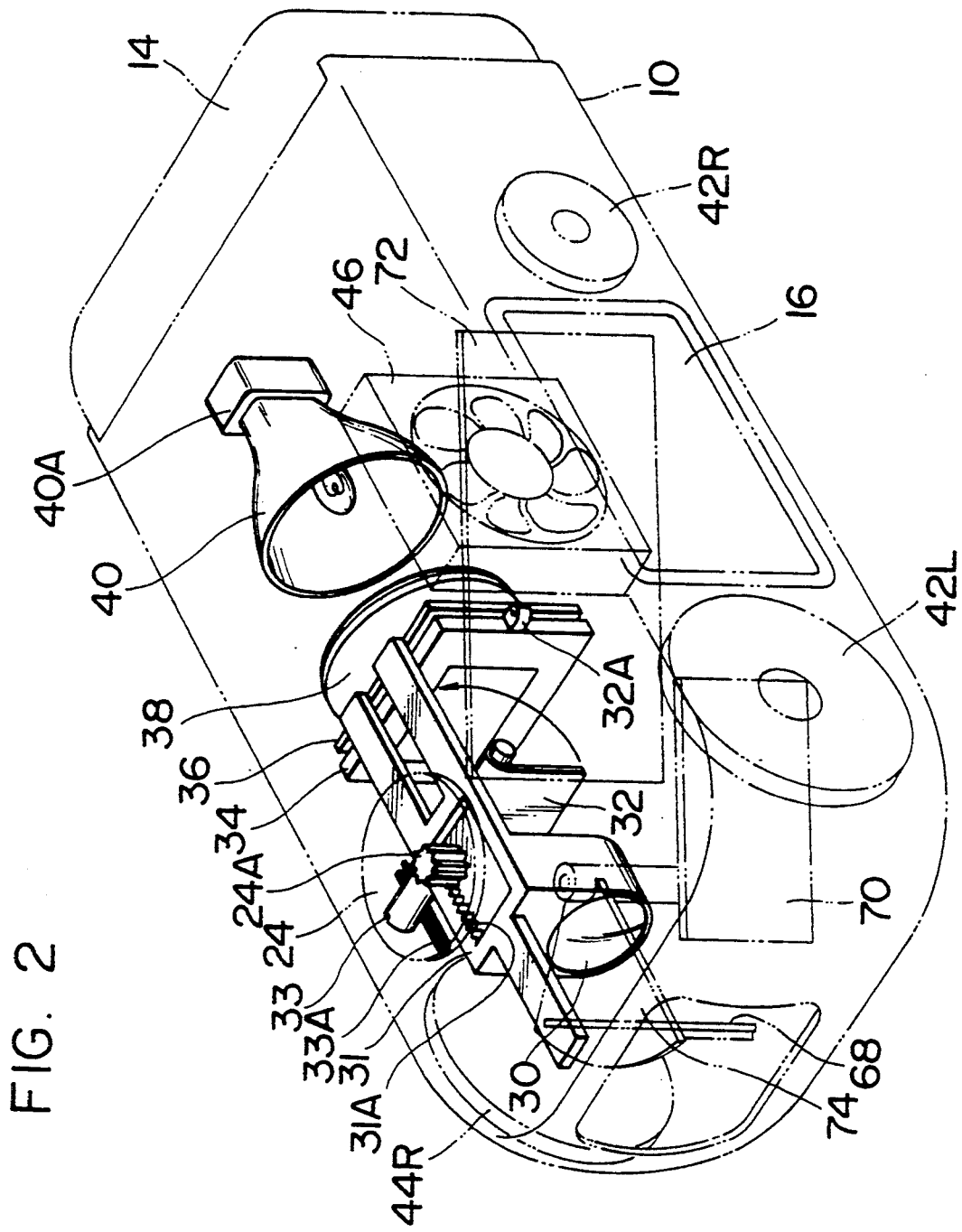
FIG. 2 is an internal perspective view of the embodiment shown in FIG. 1, mainly showing a projection optical system thereof.
Figure 5:
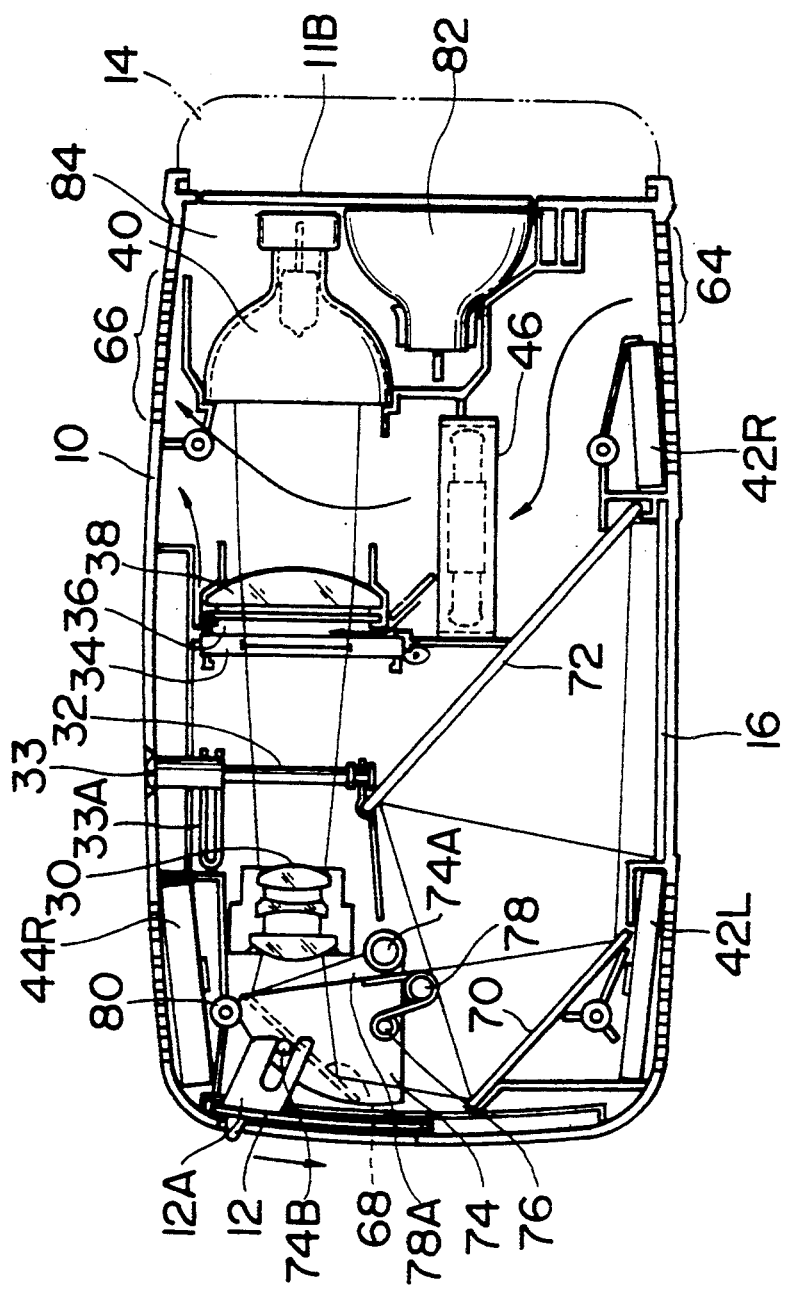
FIG. 5 is a plan view of the embodiment shown in FIG. 1, showing the interior thereof during monitor mode.

FIG. 2 mainly shows, in an internal perspective view, a projection optical system of the apparatus shown in FIG. 1. Referring to FIG. 2, a projection lens 30, a phase shift filter 32, a light-transmisson-type color liquid-crystal panel 34 of approximately one inch, a deflection plate 36, a condenser lens 38, and an 18-Watt tungsten halogen lamp 40 having a mirror are subsequently arranged in a line (see FIG. 5) in the interior of the case 10. As best shown in FIG. 5, the projection lens 30 et seq. are arranged on one side of the center line of the case 10, more specifically, arranged at a one-sided location close to a second side surface of the case 10 which opposes the first side surface where the monitor screen 16 is disposed.

The projection lens 30 is mounted on a lens supporting frame 31 capable of moving along the optical axis of the projection lens 30. The lens supporting frame 31 has a rack 31A meshing with a gear 24A provided on the lower surface of the focus control 24. Therefore, when the focus control 24 is rotated in one of the directions indicated by the associated arrows in FIG. 1, the lens supporting frame 31 is accordingly moved along the optical axis to thereby bring the projection lens 30 into focus.

The phase shift filter 32 is capable of rotating by 90° about a filter shaft 33 having an exposed end formed with a groove. The groove allows a coin or the like to be fitted therein to rotate the filter shaft 33 so that the phase shift filter 32 is inserted into or withdrawn from the projection optical system. When the phase shift filter 32 is inserted in the projection optical system, the picture elements on the liquid-crystal panel 34 are blurred, thereby making it possible to obtain an image whose picture elements are relatively inconspicuous. When the phase shift filter 32 is retracted from the projection optical system, an image which is clear but has conspicuous picture elements can be obtained. The selection as to which type of image is to be projected can be effected by suitably rotating the phase shift filter 32. A click spring 33A abuts on a part of the peripheral surface of the filter shaft 33, and that part of the peripheral surface of the filter shaft 33 is formed with flat portions perpendicular to each other. Therefore, when the phase shift filter 32 has rotated by 90°, a click action is provided.

Figure 4:
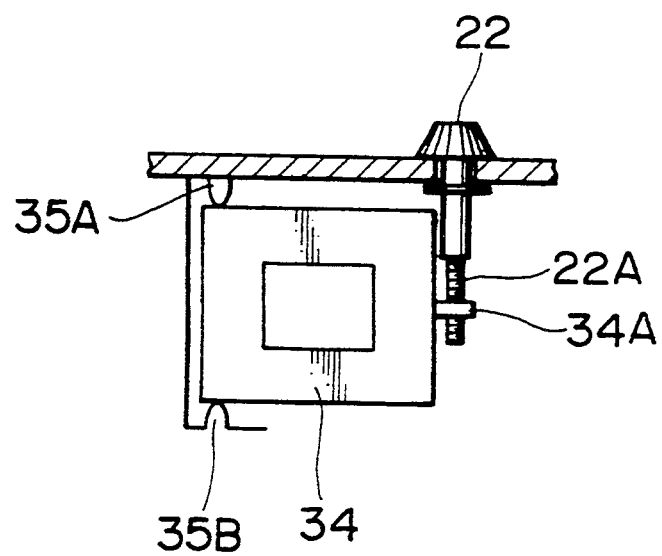
FIG. 4 is a view for explaining horizontal adjustment of a display panel.

As shown in FIG. 4, the liquid-crystal panel 34 is supported by supporting protrusions 35A and 35B in such a manner as to be rotatable in a panel plane, and has a nut portion 34A engaging with a bolt portion 22A of the panel horizontal-adjustment control 22. Thus, the liquid-crystal panel 34 is supported at three points by the supporting protrusions 35A and 35B and the nut portion 34A in such a manner that, when the panel horizontal-adjustment control 22 is rotated, the liquid-crystal panel 34 rotates accordingly in the panel plane. This enables the position of a projected image to be adjusted to a horizontal position.

Referring to FIG. 2, the apparatus includes left and right stereo speakers 42L and 42R disposed at frontward and rearward positions on either side of the monitor screen 16. Another speaker 44R, capable of serving as a right speaker, is disposed on the second side surface of the case 10 opposite the first side surface where the monitor screen 16 is provided. The apparatus also includes a cooling fan 46, described later.

Figure 3:
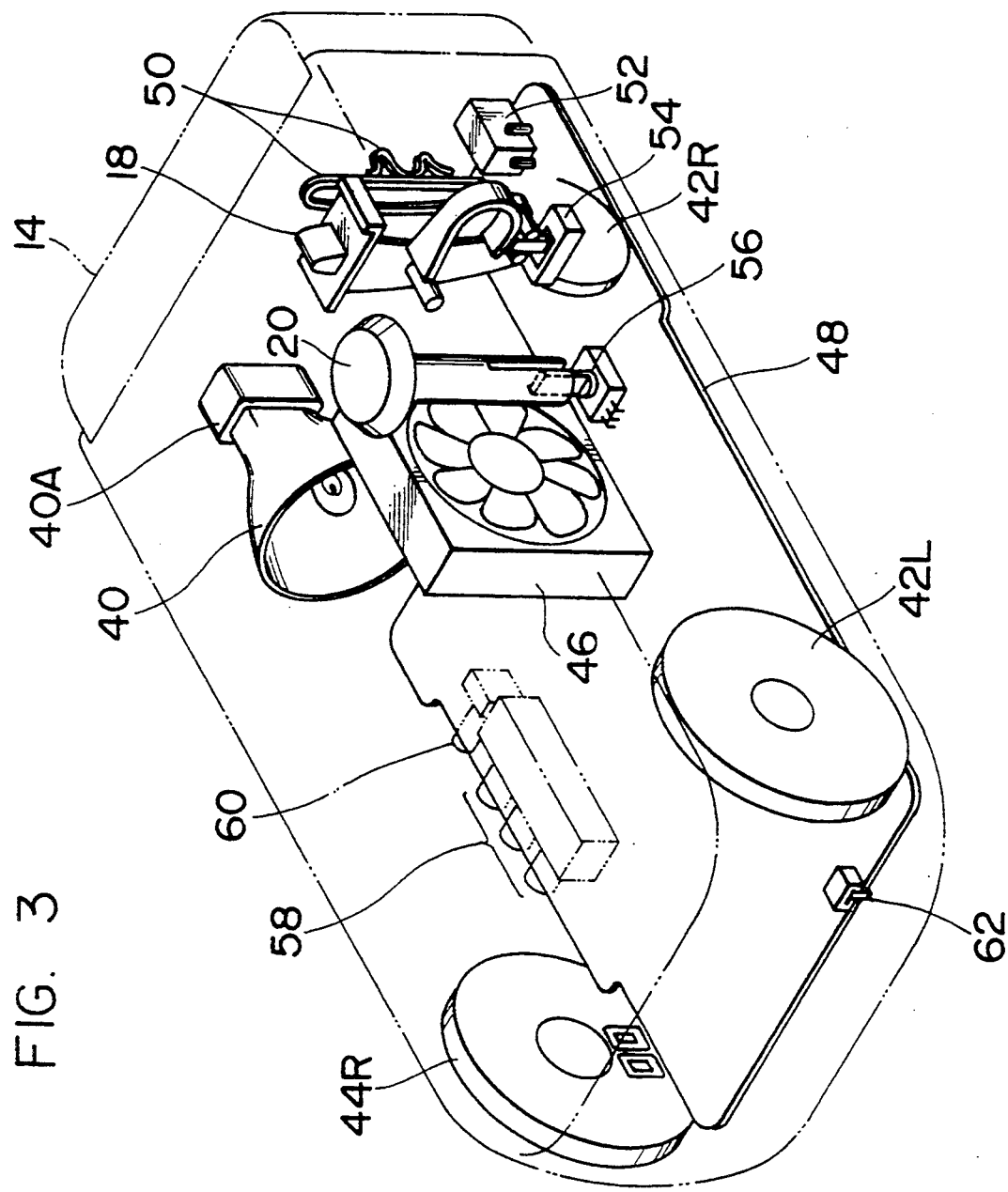
FIG. 3 is an internal perspective view of the embodiment shown in FIG. 1, mainly showing an electrical system thereof.

FIG. 3 mainly shows, in an internal perspective view, an electrical system of the apparatus. As shown in FIG. 3, a circuit board 48 on which a video circuit, an audio circuit, a power circuit, etc. (none of which are shown) are mounted is provided on the bottom of the case 10.

Various other elements are mounted on the circuit board 48, and they include a terminal pin 50 for inputting power from the battery 14, the terminal pin 50 elastically projecting from a rear position of the case 10. Among other elements mounted on the circuit board 48, there are a DC jack 52 for inputting power from an external power source, a power switch 54 for turning on and off the power supply, a sound volume element (variable resistor) 56, input terminals 58 for inputting a video signal and left and right audio signals, a brightness-adjustment element 60, and a lens cover detection switch 62. The power switch 54 is turned on and off through the power switch control 18. The sound volume element 56 is rotated by rotating the volume control 20.

A cord connected to the cooling fan 46, and a cord connected to a lamp terminal mount 40A of the tungsten halogen lamp 40 (neither of which cords are shown) are soldered to output terminals (not shown) on the circuit board 48.

A system for cooling the liquid-crystal panel 34, the tungsten halogen lamp 40, etc. will be described.

As shown in FIG. 5, the cooling fan 46 is disposed at a position inward of the liquid-crystal panel 34, the tungsten halogen lamp 40, etc. An air inlet opening 64 and an air outlet opening 66 are formed in the first and second side surfaces of the case 10.

Air blown in from the air inlet opening 64 by the operation of the fan 46 flows as indicated by the associated arrows in FIG. 5, and after passing the gap between the liquid-crystal panel 34 and the deflection plate 36 as well as the gap between the condenser lens 38 and the tungsten halogen lamp 40, air is sent out from the air outlet opening 66. This flow of air cools the liquid-crystal panel 34 and the like.

Next, descriptions will be given of a mode (hereinafter referred to as "monitor mode") in which an image displayed on the liquid-crystal panel 34 is projected on the back surface of the monitor screen 16 disposed on the first side surface of the case 10, and another mode (hereinafter referred to as "projector mode") in which such an image is projected on an enlarged scale on an external screen ahead of the projection lens 30.

Figure 6:
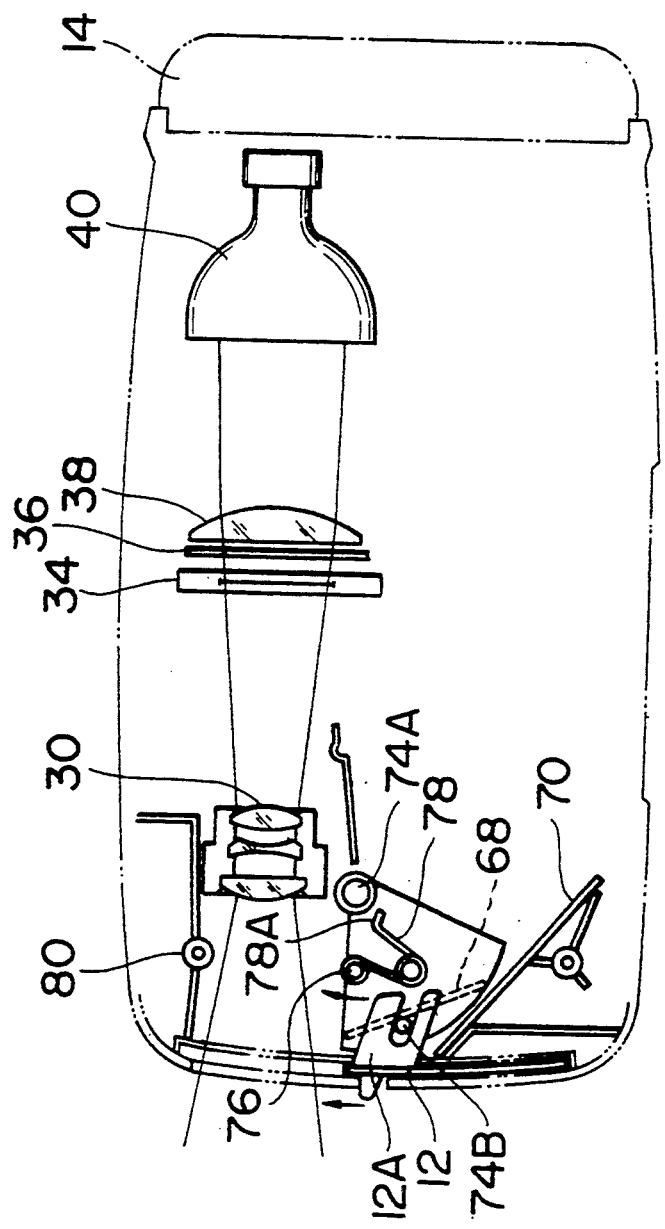
FIG. 6 is a plan view of the embodiment shown in FIG. 1, showing the interior thereof during projector mode.

FIGS. 5 and 6 show, in plan views, the internal constructions of the video projector with a monitor screen during the monitor mode and the projector mode, respectively. As shown in FIGS. 5 and 6, an optical system is disposed inside the case 10, the optical system comprising a movable reflecting mirror 68 capable of advancing to a predetermined position in front of the projection lens 30 and retracting therefrom, and two stationary reflecting mirrors 70 and 72 disposed at fixed positions on the inside of the case 10.

Descriptions will be given first of a mechanism for moving the movable reflecting mirror 68.

The reflecting mirror 68 is mounted on a fan-shaped arm 74 capable of rotating about the axis of an arm pivot 74A (see FIG. 2 as well). An arm pin 74B projects at a distal end position of the arm 74, while a projection 12A engaging with the arm pin 74B is formed on the reverse (or inner) surface of the lens cover 12.

Therefore, when the lens cover 12 is moved to open or close it, the arm 74 is rotated so that the reflecting mirror 68 is retracted from or advanced to the predetermined position in front of the projection lens 30.

A pin 76 projects from the case 10, and a click spring 78 is disposed between the pin 76 and the arm 74. As shown in FIG. 5, when a portion 78A of the click spring 78 at which the click spring 78 engages the arm 74 is positioned above (as viewed in FIG. 5) the line interconnecting the pin 76 and the arm pivot 74A, the click spring 78 urges the arm 74 in the clockwise direction, as viewed in FIG. 5. As shown in FIG. 6, when the engaging portion 78A is positioned below that line, the click spring 78 urges the arm 74 in the counter-clockwise direction, as viewed in FIG. 6. Referring to FIG. 5, a stopper 80 is able to abut on the leading edge of the arm 74 during clockwise rotation thereof, so as to limit the clockwise rotation. Thus, the reflecting mirror 68 is set at the predetermined position in front of the projection lens 30. In FIGS. 5 and 6, the arrows associated with the lens cover 12 and the arm 74 indicate directions in which these members can move from the illustrated positions against the urging force of the click spring 78.

When the reflecting mirror 68 is moved to and set at the predetermined position in front of the projection lens 30, as shown in FIG. 5, monitor mode is entered. In this mode, image light emitted from the projection lens 30 is reflected by the three reflecting mirrors 68, 70 and 72, and is thus guided to the back surface of the monitor screen 16.

Accordingly, the monitor screen 16 displays a relatively bright image which can be seen even in a relatively bright place. With the above arrangement, since the optical path of image light emitted from the projection lens 30 is bent by the three reflecting mirrors 68, 70 and 72 to be guided to the monitor screen 16 on the first side surface of the case 10, it is possible to obtain a relatively long optical path within a compact case 10. This makes it possible to project an image on the monitor screen 16 at a relatively great enlargement magnification.

On the other hand, when the reflecting mirror 68 is retracted from the position in front of the projection lens 30, as shown in FIG. 6, projector mode is entered. In this mode, image light emitted from the projection lens 30 is projected on an enlarged scale on an external screen, a wall or the like separately provided ahead of the projection lens 30.

The lens cover detection switch 62 shown in FIG. 3 is turned on and off in accordance with the closed and open positions of the lens cover 12. Accordingly, determination is made as to whether the video projector with a monitor screen is in monitor mode or projector mode on the basis of the detection output of the lens cover detection switch 62. If the apparatus is in monitor mode, the left and right speakers 42L and 42R positioned on either side of the monitor screen 16 are actuated, whereas if the apparatus is determined to be in projector mode, the left and right speakers 42L and 44R positioned on either side of the projection lens 30 are actuated. Thus, the speaker 42L can be used in either mode, whereas one of the right speakers, 42R or 44R, is switchingly actuated in accordance with which of monitor and projector modes is entered. By virtue of this arrangement, it is possible to generate stereo sound in accordance with the type of mode (monitor mode or projector mode) currently effected, that is, in accordance with the positional relationship between the video projector with a monitor screen and the viewer(s).

Figure 7:
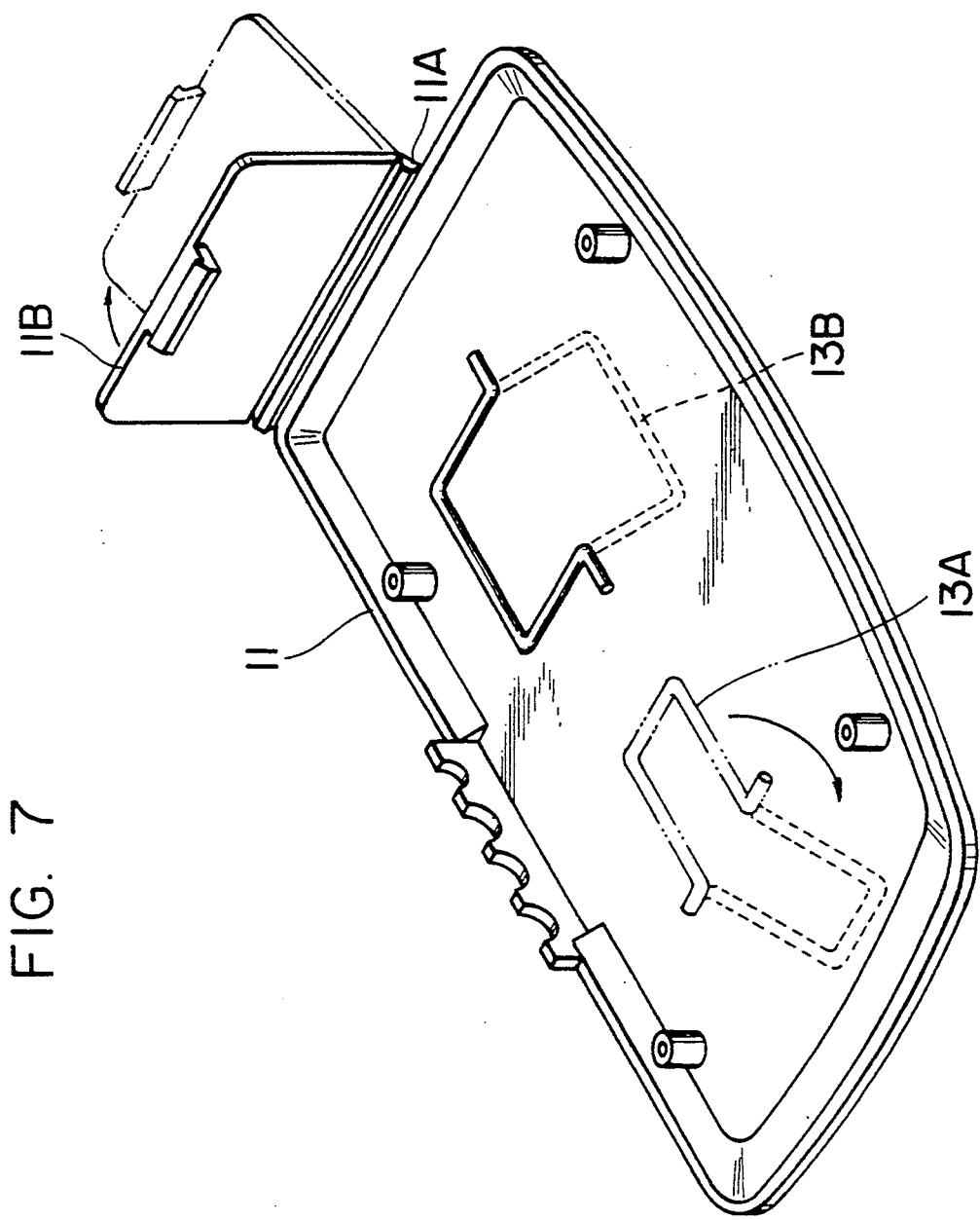
FIG. 7 is a perspective view showing an embodiment of a bottom case.

FIG. 7 shows, in a perspective view, an embodiment of a bottom case.

Referring to FIG. 7, a bottom case 11 comprises an integral structure which includes a hinge portion 11A and a rear cover 11B, and which is made of a suitable material such as polypropylene. The rear cover 11B is opened and closed during the operation of replacing the lamp 40. When the rear cover 11B is opened and closed, a lamp receptacle 84 (shown in FIG. 5) containing a spare lamp 82 is opened and closed, respectively.

A foldable leg 13A which can be raised during projector mode, and another foldable leg 13B which can be raised during monitor mode are provided on the outer surface of the bottom case 11.

Figure 8:
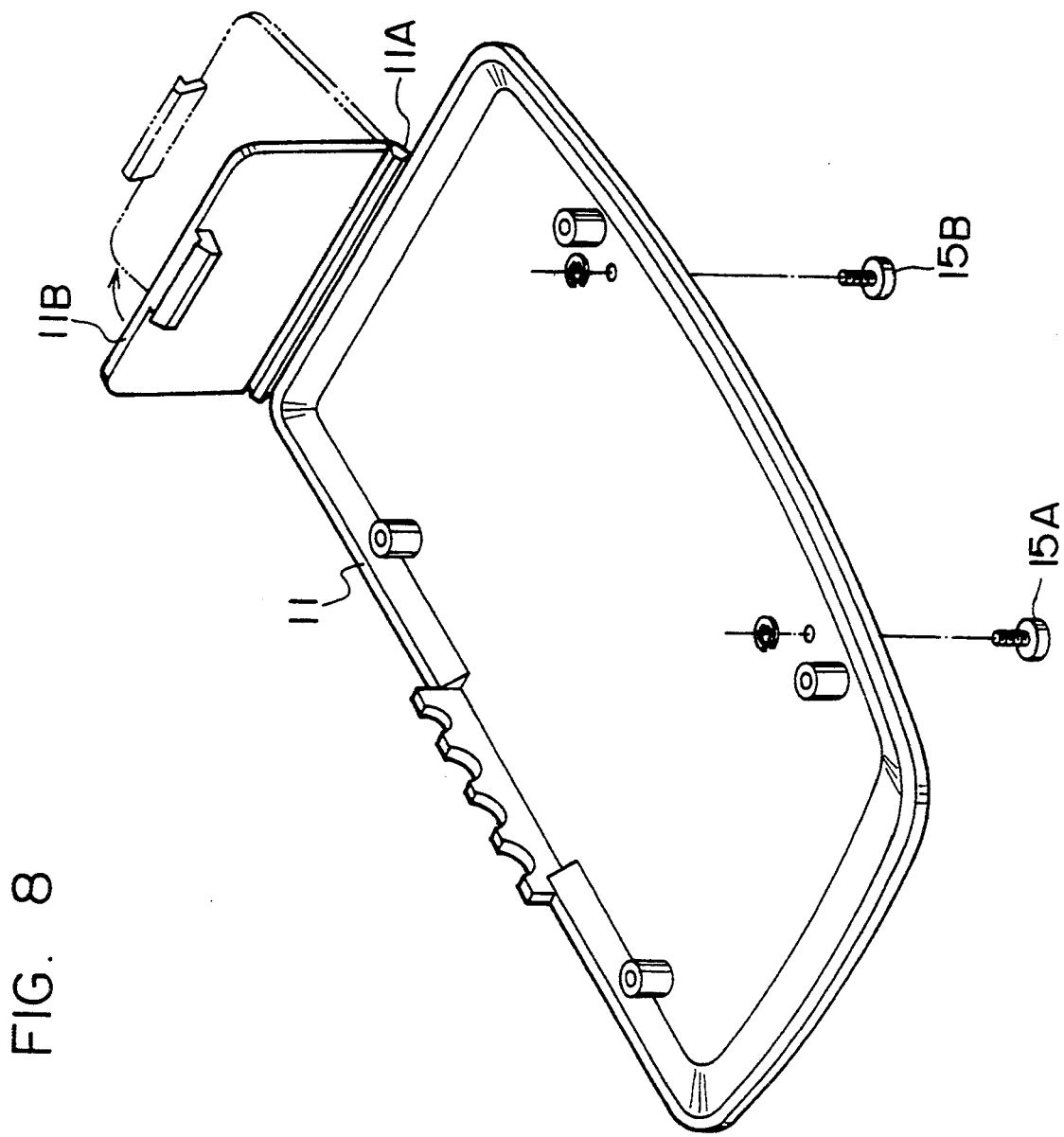
FIG. 8 is a perspective view showing another embodiment of a bottom case.

FIG. 8 shows, in a perspective view, another embodiment of a bottom case. In FIG. 8, components common to both embodiments shown in FIGS. 7 and 8 are designated by the same reference characters, and their detailed descriptions will be omitted.

The embodiment shown in FIG. 8 is distinguished in that the foldable legs 13A and 13B shown in FIG. 7 are substituted by a structure including a pair of threaded legs 15A and 15B. These threaded legs 15A and 15B are disposed at a one-sided location of a bottom case 11 which is close to the monitor screen 16, and are arranged with a certain interval therebetween along the space between the front end and the rear end of the projector.

During projector mode, only the height of the threaded leg 15A can be adjusted to adjust the angle of projection to an external screen or the like. During monitor mode, both heights of the threaded legs 15A and 15B can be adjusted to adjust the inclination of the monitor screen 16.

Second Embodiment

Figure 9:
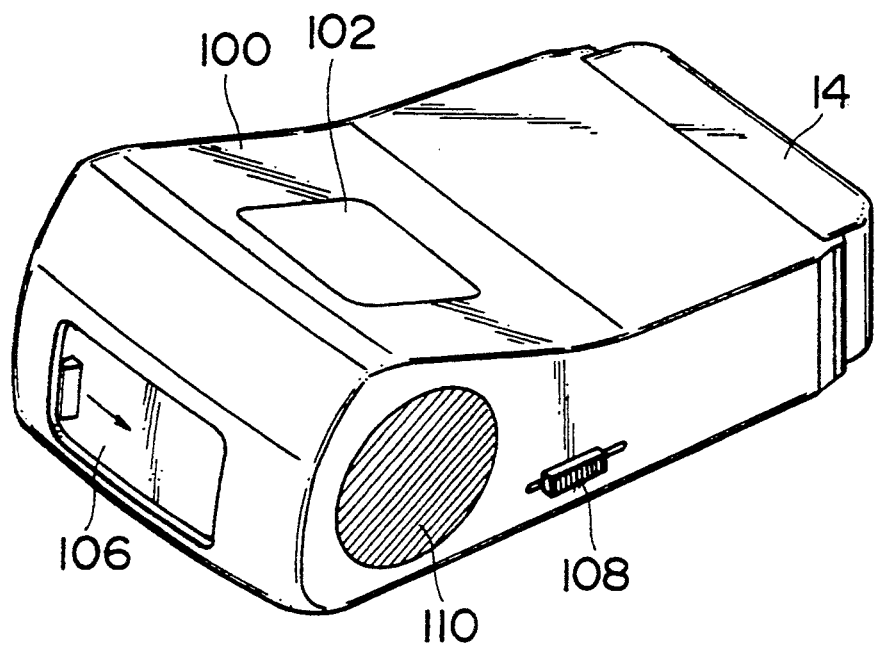
FIG. 9 is an external perspective view of a second embodiment of a video projector with a monitor screen according to the present invention.
Figure 10:
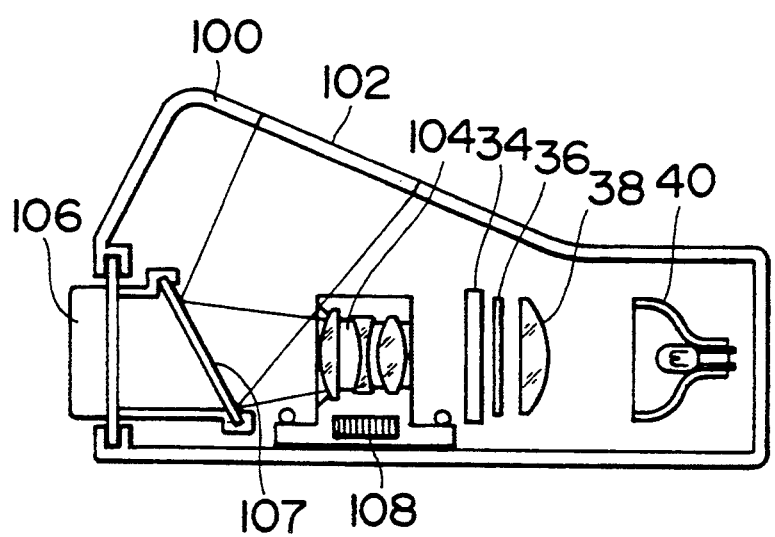
FIG. 10 is a view showing an internal construction of the embodiment shown in FIG. 9.

FIG. 9 shows the external appearance of a second embodiment of a video projector with a monitor screen according to the present invention. FIG. 10 shows an internal construction of the embodiment shown in FIG. 9. Components which are common to the second embodiment and the first embodiment shown in FIGS. 1 et seq. are designated by the same reference characters, and their detailed description will be omitted.

Referring to FIGS. 9 and 10, the apparatus according to the second embodiment includes a case 100, a monitor screen 102 provided on an upper surface of the case 100, a projection lens 104, a lens cover 106, a focus control 108, and a speaker 110.

The lens cover 106 is disposed on a front surface of the case 100 in such a manner as to be capable of opening and closing. A reflecting mirror 107 is provided on the reverse (inner) surface of the lens cover 106 in such a manner as to be integral therewith. When the lens cover 106 is closed, the reflecting mirror 107 is inserted in the optical axis of the projection lens 104 at a position in front of the projection lens 104. When the lens cover 106 is opened, the reflecting mirror 107 is retracted from the optical axis of the projection lens 104.

The video projector with a monitor screen according to the second embodiment enables monitor mode and projector mode to be switched from one to the other by closing or opening the lens cover 106 in a manner similar to that in the first embodiment. When the lens cover 106 is closed, monitor mode is entered, in which image light emitted from the projection lens 104 is reflected by the reflecting mirror 107 to be guided to the back surface of the monitor screen 102.

Third Embodiment

Figure 11:
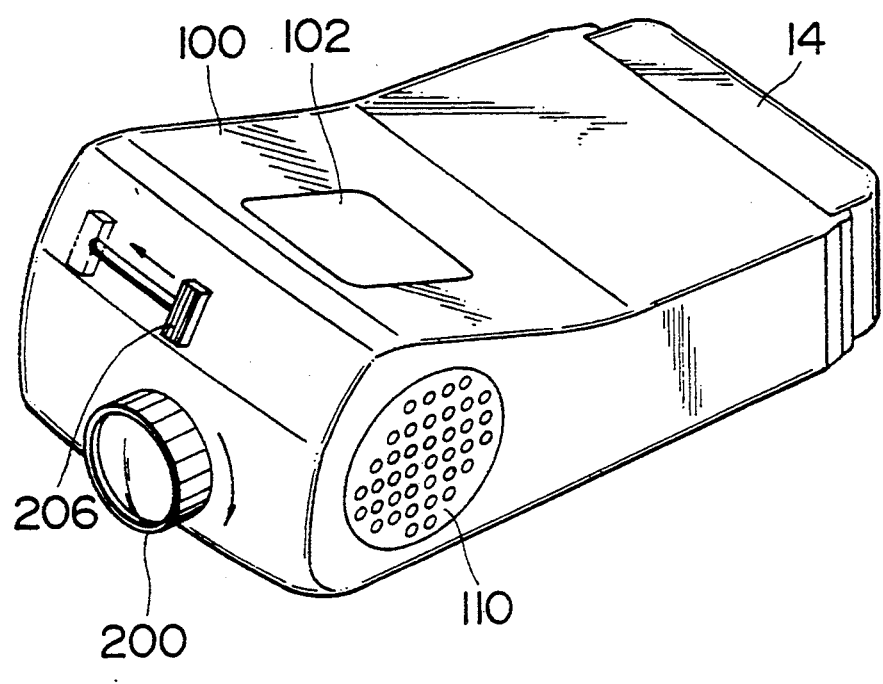
FIG. 11 is an external perspective view of a third embodiment of a video projector with a monitor screen according to the present invention.
Figure 12:
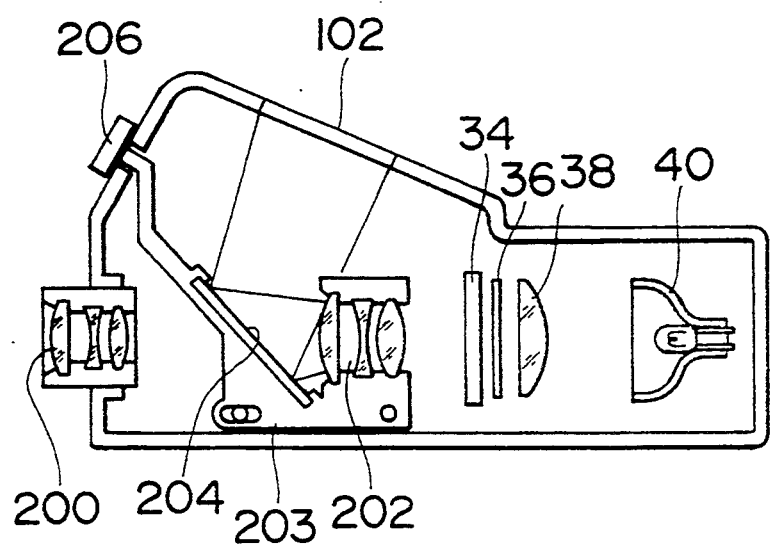
FIG. 12 is a view showing an internal construction of the embodiment shown in FIG. 11.

FIG. 11 shows the external appearance of a third embodiment of a video projector with a monitor screen according to the present invention. FIG. 12 shows an internal construction of the embodiment shown in FIG. 11. Components which are common to the third embodiment and the second embodiment shown in FIGS. 9 and 10 are designated by the same reference characters, and their detailed description will be omitted.

Referring to FIGS. 11 and 12, the apparatus according to the third embodiment includes a projection lens 200 for use in projector mode, another projection lens 202 for use in monitor mode, a reflecting mirror 204, and a control 206 for switching monitor and projector modes.

The projector-mode projection lens 200 is disposed on the case 100 in such a manner as to be rotatable relative thereto. When this projection lens 200 is rotated, it advances or retracts along its optical axis so as to enable focus adjustment.

The monitor-mode projection lens 202 and the reflecting mirror 204 are together mounted on a slide member 203 movable in a direction perpendicular to the optical axis, and are capable of advancing into and retracting from the optical path between the liquid-crystal panel 34 and the projector-mode projection lens 200 by operating the monitor/projector mode switching control 206. When the monitor-mode projection lens 202 and the reflecting mirror 204 are inserted in that optical path, monitor mode is entered, in which image light emitted from the projection lens 202 is reflected by the reflecting mirror 204 to be guided to the back surface of the monitor screen 102.

According to the third embodiment, it is possible to adopt a monitor-mode projection lens having a wider angular field, thereby making it possible to obtain a monitor image at a relatively great enlargement magnification even with a short optical path to the monitor screen 102. Another advantage is that focusing is not necessary during monitor mode.

Fourth Embodiment

Figure 13:
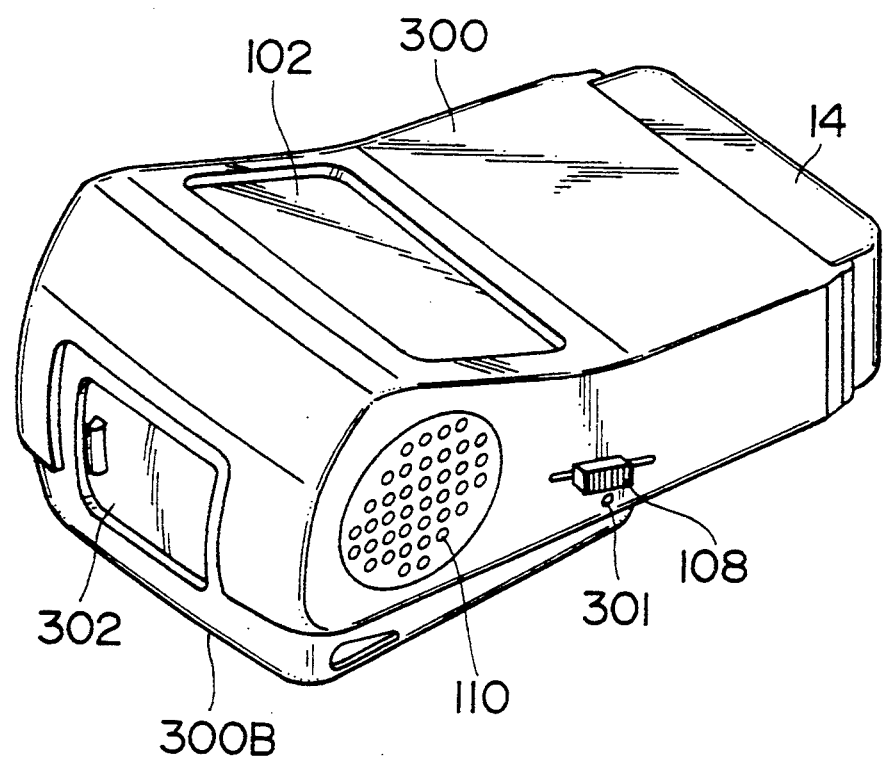
FIG. 13 is an external perspective view of a fourth embodiment of a video projector with a monitor screen according to the present invention.
Figure 14:
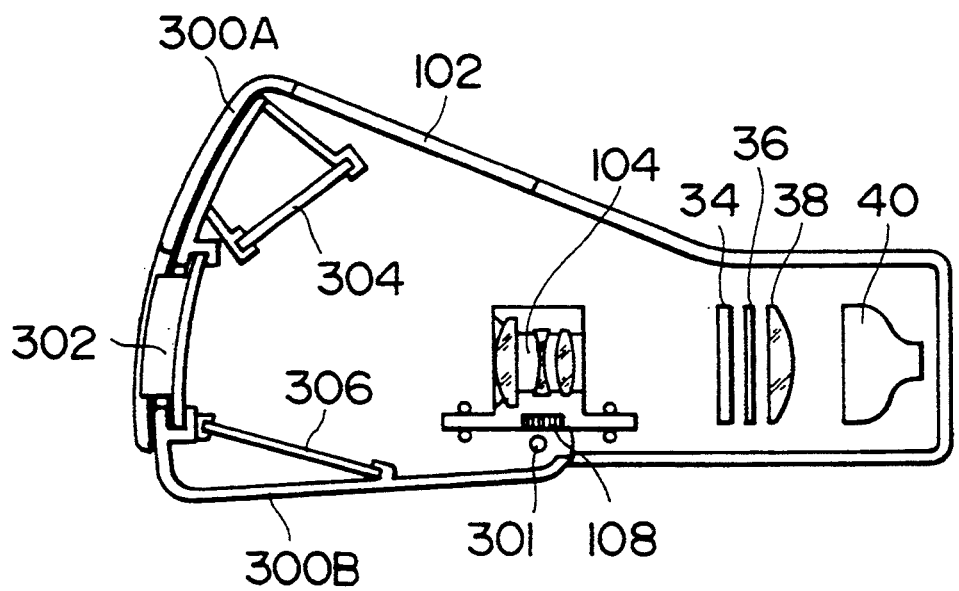
FIG. 14 is a view showing an internal construction of the embodiment shown in FIG. 13 during projector mode.
Figure 15:
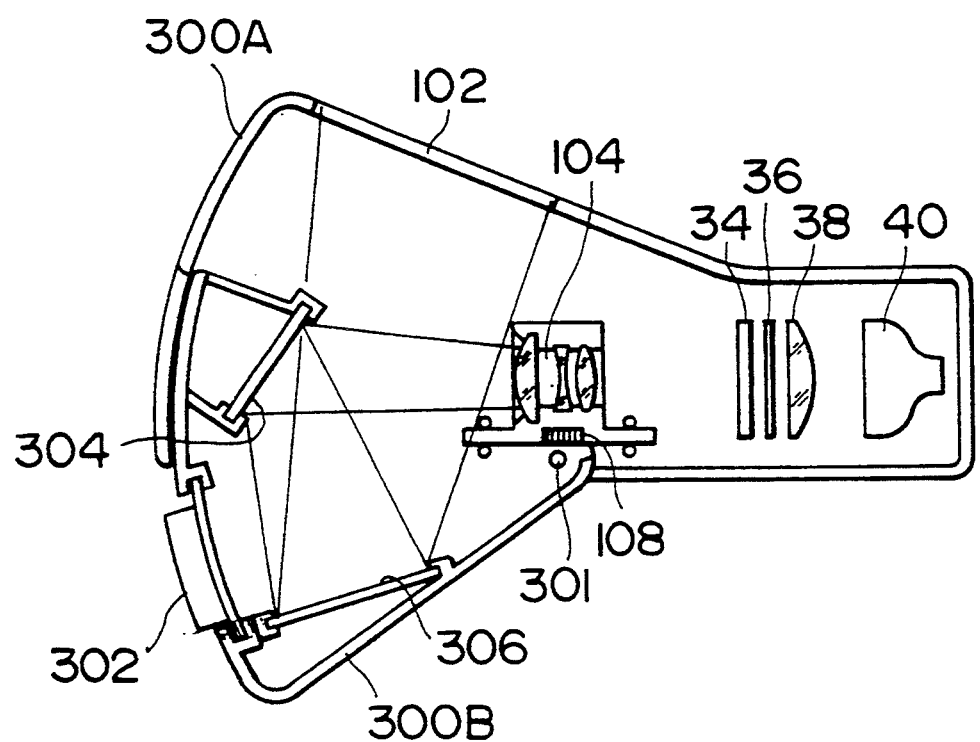
FIG. 15 is a view showing an internal construction of the embodiment shown in in FIG. 13 during monitor mode.

FIG. 13 shows the external appearance of a fourth embodiment of a video projector with a monitor screen according to the present invention. FIGS. 14 and 15 show internal constructions of the embodiment shown in FIG. 13. Components which are common to the fourth embodiment and the second embodiment shown in FIGS. 9 and 10 are designated by the same reference characters, and their detailed description will be omitted.

Referring to FIGS. 13 to 15, the apparatus according to the fourth embodiment includes a casing body 300A, a bottom case 300B, a lens cover 302, and reflecting mirrors 304 and 306.

The bottom case 300B is disposed rotatable relative to the casing body 300A about a pivot 301. A lens cover 302 is disposed on a front surface of the bottom case 300B in such a manner as to be capable of opening and closing. Two reflecting mirrors 304 and 306 are disposed at certain positions on the inside of the bottom case 300B.

FIG. 14 shows the internal construction of the apparatus during projector mode. In this mode, when the lens cover 302 is opened, image light emitted from the projection lens 104 is projected on an external screen or the like.

FIG. 15 shows the internal construction of the apparatus during monitor mode. In this mode, the bottom case 300A is rotated by a prescribed amount from the position shown in FIG. 14 about the pivot 301 in the counter-clockwise direction, as viewed in FIG. 15. This rotation causes the reflecting mirror 304, integrally mounted in the interior of the bottom case 300B, to be inserted into the optical axis of the projection lens 104 at a position in front of the projection lens 104. As a result, image light emitted from the projection lens 104 is reflected from the reflecting mirror 304, and then reflected from the reflecting mirror 306 to be guided to the back surface of the monitor screen 102.

With the above described arrangement of the fourth embodiment, the outward movement of the reflecting mirrors 304 and 306 makes it possible to achieve an increase in the optical path, hence, an increase in the enlargement magnification at which an image is projected on the monitor screen 102. In the monitor mode of the fourth embodiment, since image light is reflected from the two reflecting mirrors 304 and 306, it is necessary that the liquid-crystal panel 34 display an electrically inverted image.

Fifth Embodiment

Figure 16:
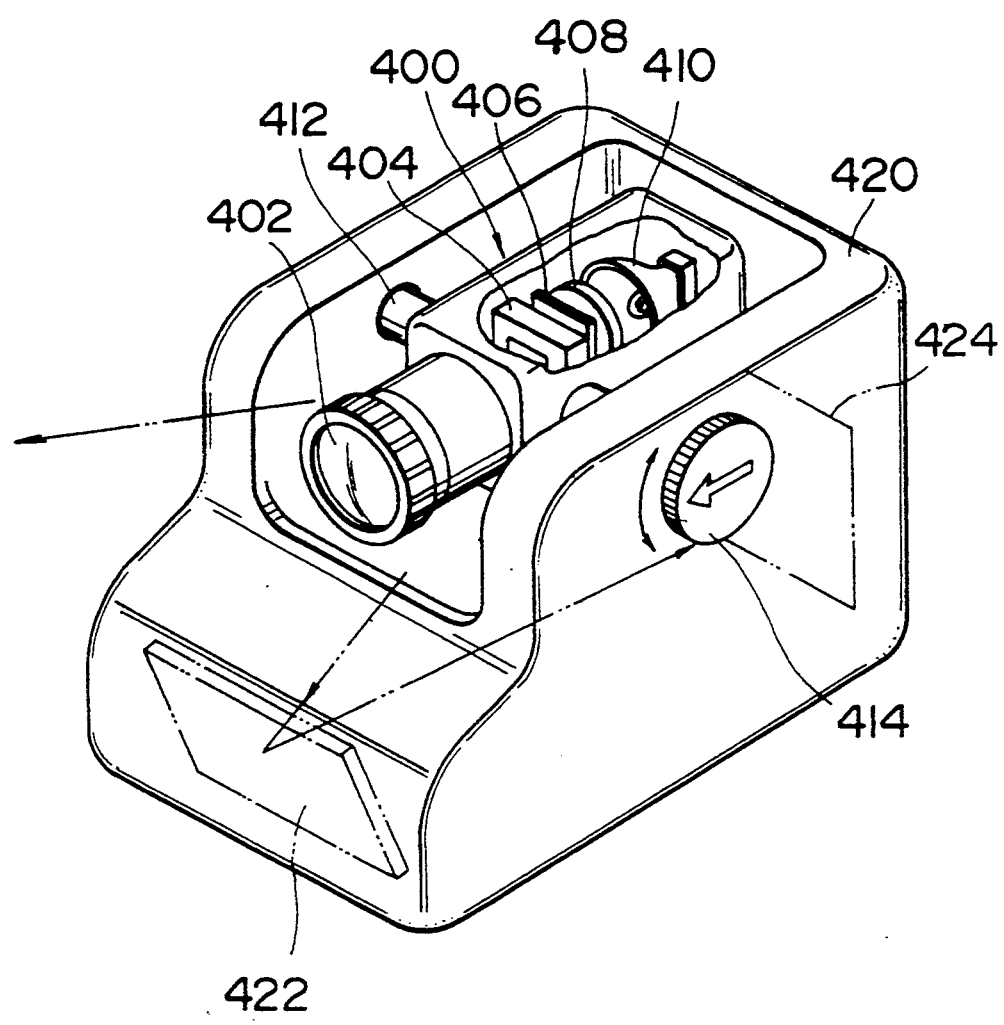
FIG. 16 is an external perspective view of a fifth embodiment of a video projector with a monitor screen according to the present invention.

FIG. 16 shows the external appearance of a fifth embodiment of a video projector with a monitor screen according to the present invention. Referring to FIG. 16, an apparatus according to this embodiment mainly comprises a projection block 400, a casing 420, a reflecting mirror 422, and a monitor screen 424.

The projection block 400 comprises a projection lens 402, a liquid-crystal panel 404, a deflection plate 406, a condenser lens 408 and a tungsten halogen lamp 410, and is disposed in the interior of the casing 420 in such a manner as to be rotatable about a shaft 412. The projection block 400 is rotated by a desired angle by suitably rotating a monitor/projector mode switching control 414. The reflecting mirror 422 is disposed at a frontward position in the interior of the casing 420. The monitor screen 424 is disposed on a rear surface of the casing 420.

With the above-described construction, when the projection block 400 is rotated upward by suitably rotating the monitor/projector mode switching control 414, the projection block 400 is brought to a position for projecting image light emitted from the projection lens 402 on an external screen or the like. On the other hand, when the projection block 400 is rotated downward so that the projection lens 402 faces the reflecting mirror 422, it is possible to cause image light emitted from the projection lens 402 to be reflected from the reflecting mirror 422, and thus guided to the back surface of the monitor screen 424.

The monitor/projector mode switching control 414 may also be used to adjust the horizontal position of an image during projector mode.

Sixth Embodiment

Figure 17:
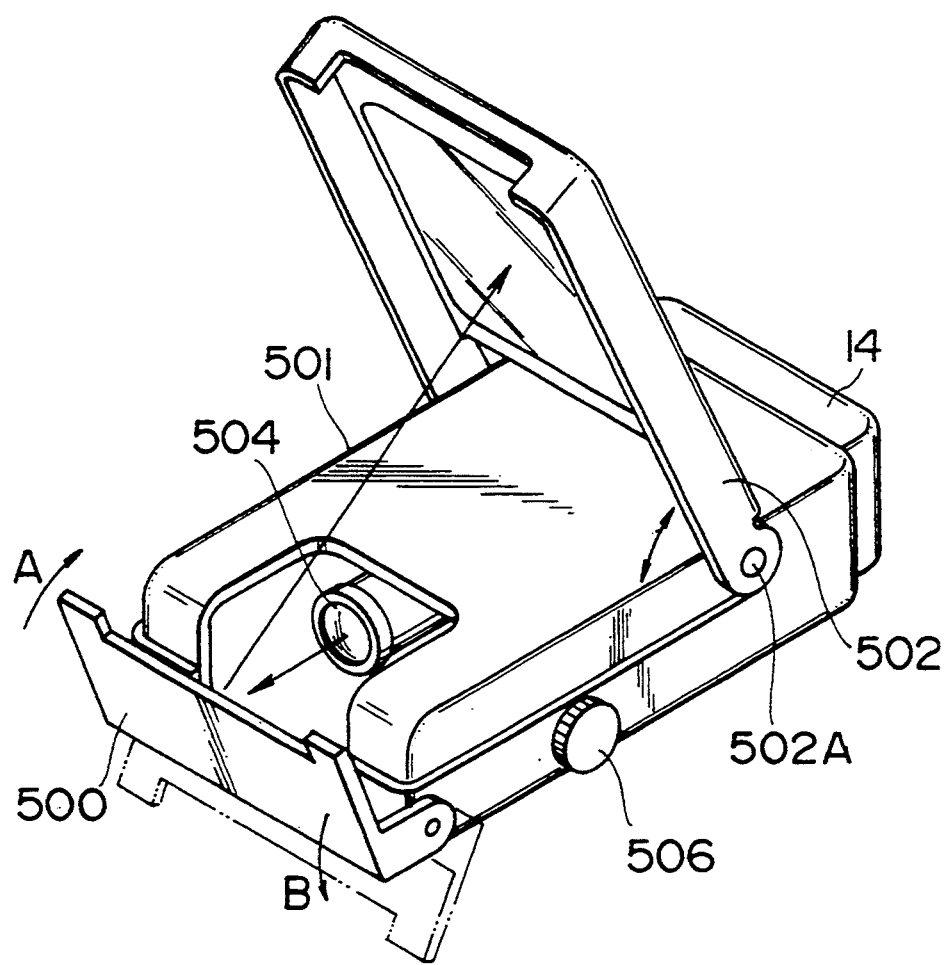
FIG. 17 is an external perspective view of a sixth embodiment of a video projector with a monitor screen according to the present invention.

FIG. 17 shows the external appearance of a sixth embodiment of a video projector with a monitor according to the present invention. Referring to FIG. 17, an apparatus according to this embodiment includes a lens cover 500, a monitor screen member 502, a projection lens 504, and a focus control 506.

The lens cover 500 is disposed rotatable relative to a casing 501 about the axis of a cover shaft 500A. A reflecting mirror (not shown) is provided on the reverse (inner) surface of the lens cover 500. The monitor screen member 502 is disposed rotatable relative to the casing 501 about a screen shaft 502A in either of the directions indicated by the associated arrows.

FIG. 17 relates to monitor mode of the apparatus. When the lens cover 500 and the monitor screen member 502 are rotated to the positions shown in the drawing, image light emitted from the projection lens 504 is reflected from the unillustrated reflecting mirror on the reverse surface of the lens cover 500 to be guided to the back surface of the monitor screen 502.

When the lens cover 500 is rotated from the position shown in the drawing in the direction indicated by arrow A, the lens cover 500 simply acts as a lens cover. On the other hand, when the lens cover 500 is rotated from the illustrated position in the direction indicated by arrow B to the position indicated by the two-dot-chain lines, the lens cover 500 serves as a leg for use in projector mode.

As has been described above, a video projector with a monitor screen according to the present invention is capable of being used both as an ordinary video projector and as a monitor in which an image projected on a monitor screen disposed on a casing can be viewed even in a relatively bright place. The apparatus may have a lens cover whose opening and closing facilitate switching between projector mode and monitor mode. The apparatus may have a monitor screen provided on a side surface of a casing, and three reflecting mirrors for guiding image light to the monitor screen in a bent optical path, so that it is possible to obtain a relatively long optical path with a compact apparatus, and hence, to obtain an image at a relatively great enlargement magnification.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A video projector with a monitor screen, comprising:
    a casing on which said monitor screen is disposed;
    a projection lens, transmission-type display means for displaying an image on the basis of a video signal, and a projector light source, all of which are disposed in the interior of said casing;
    a lens cover disposed movably relative to said casing so as to open and close a surface in front of said projection lens; and
    an optical system including a reflecting mirror capable of, in an interlocked relationship with the movement of said lens cover, advancing into and retracting from the optical axis of said projection lens, at least said reflecting mirror guiding image light to said monitor Screen.

2. A video projector with a monitor screen, comprising:
    a casing, wherein said casing has a shape substantially like a rectangular parallelepiped, on a side surface of which said monitor screen is fixedly disposed such that said monitor screen is substantially flush with said side surface of said casing;
    a projection lens, transmission-type display means for displaying an image on the basis of a video signal, and a projector light source, all of which are disposed in the interior of said casing; and
    an optical system including a reflecting mirror capable of advancing into and retracting from the optical axis of said projection lens, at least said reflecting mirror guiding image light to the back surface of said monitor screen.

3. A video projector with a monitor screen, according to claim 2, wherein said projection lens, said transmission-type display means, and said projector light source are all disposed at a one-sided location close to a side surface of said casing which opposes said monitor screen, and wherein said optical system comprises a first reflecting mirror, capable of advancing to and retracting from a position in front of said projection lens, for reflecting image light from said projection lens toward said monitor screen, and second and third reflecting mirrors, disposed at fixed positions of said casing, for reflecting the image light reflected from said first reflecting mirror in a substantially S-shaped or Z-shaped path to said monitor screen.

4. A video projector with a monitor screen, comprising:
- a casing on a side surface of which said monitor screen is disposed;
- a projection lens, transmission-type display means for displaying an image on the basis of a video signal, and a projector light source, all of which are disposed in the interior of said casing;
- an optical system including a reflecting mirror capable of advancing into and retracting from the optical axis of said projection lens, at least said reflecting mirror guiding image light to the back surface of said monitor screen; and
- first and second stereo speakers disposed at frontward and rearward positions on either side of said monitor screen, and a third stereo speaker, disposed on a side surface of said casing which opposes said monitor screen, for being paired with one of said first and second stereo speakers.

5. A video projector with a monitor screen, according to claim 2, further comprising a pair of height-adjustment members disposed at a one-sided location of the bottom of said casing which is close to said monitor screen, said height-adjustment members being arranged with a certain interval therebetween along the space between the front end and the rear end of said video projector.

6. A video projector with a monitor screen, according to claim 2, further comprising:
- a supporting member for supporting one side of said transmission-type display means in such a manner that said transmission-type display means is tiltable within a display plane thereof;
- an engagement portion on the other side of said transmission-type display means; and
- an adjustment member engaging with said engagement portion in such a manner as to allow adjustment of the vertical position of said engagement portion.

7. A video projector with a monitor screen, according to claim 6, wherein said adjustment member has an adjustment control knob which is rotatably disposed on and projecting from an upper surface of said casing, and a screw portion kept in threaded engagement with said engagement portion.

8. A video projector with a monitor screen, comprising:
- a casing on an upper surface of which said monitor screen is disposed;
- a first projection lens for use in projector mode, transmission-type display means for displaying an image on the basis of a video signal, and a projector light source, all of which are disposed in the interior of said casing;
- a second projection lens for use in monitor mode which is capable of advancing into and retracting from the optical path between said first projection lens and said transmission-type display means; and
- a reflecting mirror capable of advancing into and retracting from said optical path together with said second projection lens so that light emitted from said second projection lens can be guided to the back surface of said monitor screen.

9. A video projector with a monitor screen, comprising:
- a casing body on an upper surface of which said monitor screen is disposed;
- a bottom case disposed rotatable relative to said casing body, said bottom case being capable of rotating in such a manner as to close onto said casing body so as to be received in said casing body, and capable of rotating in such a manner as to open away from said casing body so as to expand an internal space at the front of said casing body;
- a projection lens, transmission-type display means for displaying an image on the basis of a video signal, and a projector light source, all of which are disposed in the interior of said casing body; and
- first and second reflecting mirrors disposed in the interior of said bottom case,
- wherein when said bottom case is closed, said first and second reflecting mirrors are retracted to positions above and below the optical path of image light emitted from said projection lens, and when said bottom case is opened, said first reflecting mirror is inserted in said optical path while said second reflecting mirror is so positioned as to guide the image light reflected from said first reflecting mirror to the back surface of said monitor screen.

10. A video projector with a monitor screen, according to claim 9, further comprising a lens cover, disposed between said first and second reflecting mirrors, for opening and closing a front surface of said bottom case.

11. A video projector with a monitor screen, according to claim 9, wherein said transmission-type display means displays a vertically inverted image when an image is to be projected to said monitor screen.

12. A video projector with a monitor screen comprising:
- a casing on a rear surface of which said monitor screen is disposed;
- a projection block disposed rotatably upward and downward relative to said casing, and normally projecting an image in a first direction normal to a front surface of said casing, said projection block comprising a projection lens, transmission-type display means for displaying an image on the basis of a video signal, and a projector light source; and
- a reflecting mirror disposed at a frontward position in the interior of said casing, said reflecting mirror guiding image light emitted from said projection lens to the back surface of said monitor screen in a direction opposite said first direction, when said projection block is rotated by a prescribed angle.

13. A video projector with a monitor screen, comprising:
- a casing having an opening formed therein, said opening extending from a part of a front surface of said casing to a part of an upper surface thereof;
- said monitor screen rotatably supported at a rearward position of said casing, said monitor screen being capable of rotating to a first position at which said monitor screen covers said upper surface of said casing, and a second position at which said monitor screen forms a certain angle from said upper surface of said casing;
- a projection lens, transmission-type display means for displaying an image on the basis of a video signal, and a projector light source, all of which are disposed in the interior of said casing; and a lens cover rotatably supported at a frontward position of said casing, said lens cover having an inner surface on which a reflecting mirror is disposed, wherein said reflecting mirror guides image light emitted from said projection lens to the back surface of said monitor screen when said lens cover is rotated to a position at which said reflecting mirror is positioned in front of said projection lens while said monitor screen is simultaneously rotated to said second position.

14. A video projector with a monitor screen, according to claim 13, wherein when said lens cover is rotated beyond said position at which Said reflecting mirror is positioned in front of said projection lens, said lens cover is able to serve as an adjustment leg for adjusting the inclination of said casing.

15. A video projector with a monitor screen, comprising:
a casing;.
a projection lens, transmission-type display means for displaying an image on the basis of a video signal, and a projector light source, all of which are disposed in the interior of said casing;
a supporting member for supporting one side of said transmission-type display means in such a manner that said transmission-type display means is tiltable within a display plane thereof;
an engagement portion on the other side of said transmission-type display means; and
an adjustment member engaging with said engagement portion in such a manner as to allow adjustment of the vertical position of said engagement portion.

16. A video projector with a monitor screen, according to claim 15, wherein said adjustment member has an adjustment control portion which is rotatably disposed on and projecting from an upper surface of said casing, and a portion kept in threaded engagement with said engagement portion.

17. A video projector with a monitor screen, comprising:
a casing on a side surface of which said monitor screen is disposed;
a projection lens, transmission-type display means for displaying an image on the basis of a video signal, and a projector light source, all of which are disposed in the interior of said casing;
a lens cover disposed movably relative to said casing so as to open and close a surface in front of said projection lens; and
an optical system including a reflecting mirror capable of, in an interlocked relationship with the movement of said lens cover, advancing into and retracting from the optical axis of said projection lens, at least said reflecting mirror guiding image light to the back surface said monitor screen.

18. The video projector of claim 1 wherein whenever said lens cover is moved so as to close said surface in front of said projection lens, the casing is sealed to environmental external light.

19. The video projector of claim 2 further comprising means operable in an interlocked relationship with said reflecting mirror to seal said casing from environmental external light whenever said reflecting mirror is advanced into the optical axis of said projection lens.

20. The video projector of claim 17 whereby whenever said lens cover is moved so as to close said surface in front of said projection lens, the casing is sealed to environmental external light.

* * * * *